(12) United States Patent
Vuyyuru et al.

(10) Patent No.: US 12,353,882 B1
(45) Date of Patent: Jul. 8, 2025

(54) NEXT FETCH PREDICTION USING HISTORY

(71) Applicant: Apple Inc., Cupertino, CA (US)

(72) Inventors: Pruthivi Vuyyuru, Santa Clara, CA (US); Niket K. Choudhary, Santa Clara, CA (US); Ilhyun Kim, Portland, OR (US); Ian D. Kountanis, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 18/161,967

(22) Filed: Jan. 31, 2023

(51) Int. Cl.
 *G06F 9/38* (2018.01)
 *G06F 9/30* (2018.01)

(52) U.S. Cl.
 CPC ........ *G06F 9/3806* (2013.01); *G06F 9/30032* (2013.01)

(58) Field of Classification Search
 CPC ............................ G06F 9/3806; G06F 9/30032
 See application file for complete search history.

(56) References Cited

U.S. PATENT DOCUMENTS

| | | | |
|---|---|---|---|
| 5,974,543 A | 10/1999 | Hijgendorf et al. | |
| 8,959,320 B2 | 2/2015 | Beaumont-Smith et al. | |
| 9,405,544 B2 | 8/2016 | Holman et al. | |
| 10,445,102 B1 | 10/2019 | Pistol | |
| 2002/0194463 A1* | 12/2002 | Henry .................... | G06F 9/323 712/E9.057 |
| 2002/0194464 A1 | 12/2002 | Henry et al. | |
| 2005/0278516 A1 | 12/2005 | Ukai et al. | |
| 2009/0049286 A1 | 2/2009 | Levitan et al. | |
| 2009/0198984 A1* | 8/2009 | Loschke ............... | G06F 9/3848 712/240 |
| 2010/0262806 A1 | 10/2010 | Doing et al. | |
| 2013/0007425 A1 | 1/2013 | Cantin et al. | |
| 2017/0139717 A1 | 5/2017 | Hornung et al. | |
| 2018/0314523 A1 | 11/2018 | Sadasivam et al. | |
| 2019/0004805 A1* | 1/2019 | Al Sheikh ............. | G06F 9/3806 |
| 2019/0163902 A1* | 5/2019 | Reid .................... | G06F 12/1009 |
| 2019/0370176 A1* | 12/2019 | Priyadarshi ......... | G06F 12/0893 |
| 2020/0012497 A1* | 1/2020 | Clouqueur ............ | G06F 9/3806 |
| 2022/0121446 A1 | 4/2022 | McDonald | |

FOREIGN PATENT DOCUMENTS

EP    1585025 A1 * 10/2005 ........... G06F 9/3846

* cited by examiner

*Primary Examiner* — Farley Abad
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to predicting a next fetch address based on a current fetch address and history information. In some embodiments, tracking circuitry generates history information based on respective addresses corresponding to multiple control transfer instructions in a stream of executed instructions. Prediction circuitry may predict a next fetch address based on a current fetch address and the history information, including to: index into a first prediction table based on at least a portion of the current fetch address and at least a portion of the history information, compare tag data for an indexed location in the first prediction table with a tag that includes at least a portion of the current fetch address, and in response to a comparison hit in the first prediction table, provide a predicted next fetch address from the first prediction table.

17 Claims, 10 Drawing Sheets

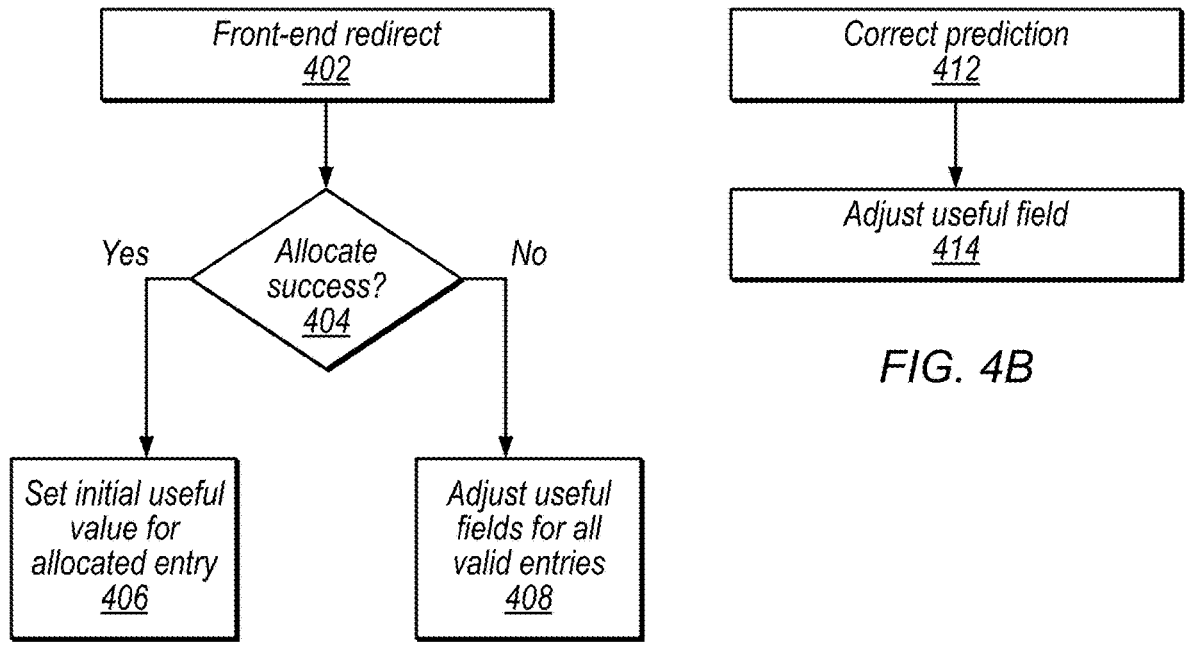
FIG. 4A
FIG. 4B
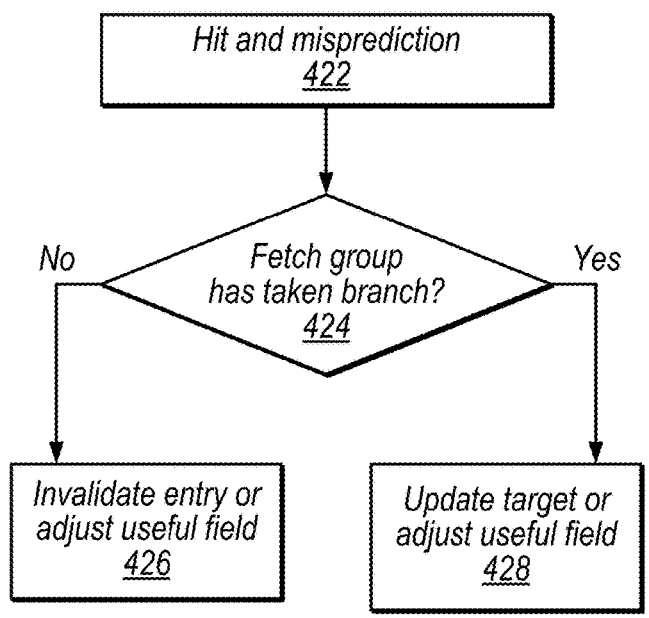
FIG. 4C

NEXT FETCH PREDICTION USING HISTORY

BACKGROUND

Technical Field

This disclosure relates generally to computer processor architecture and more particularly to branch prediction techniques.

Description of the Related Art

Computer processors typically include multiple pipeline stages that facilitate execution of program instructions. Execution may begin at an initial stage in which an instruction fetch unit retrieves instructions from memory using a register commonly referred to as a program counter or PC. In many instances, the PC value is the address of an instruction in memory. As an instruction fetch unit retrieves instructions from memory, the instruction fetch unit may increment the PC value by an instruction width multiplied by some number of instructions. This PC value may also be altered when control transfer instructions are executed such as conditional branch instructions, call instructions, return instructions, jump instructions, etc.

A variety of instruction control flow predictors, such as branch predictors, are used to predict the next target address to fetch from memory to allow the processor to fetch ahead of the control transfer instructions. If the predictions are correct, subsequent instructions to execute may already be preloaded into the processor's pipeline. Correct prediction may improve performance, as compared to fetching the instructions after executing each control transfer instruction. Furthermore, the subsequent instructions may be speculatively executed and thus may be ready to retire/commit results when the control transfer instruction is resolved (if the prediction is correct), which may further enhance performance.

A given processor sometimes includes multiple branch predictors that operate in parallel. Some branch predictors are single-cycle predictors that predict the next fetch address based on the current fetch address (these may be referred to as "next fetch predictors" (NFP)). Single-cycle predictors may operate in conjunction with other predictors that may be more complex and may provide predictions over multiple cycles.

Generally, increasing the accuracy of branch prediction improves processor performance because mispredictions have negative impacts that reduce throughput. More accurate next fetch predictors, for example, may improve throughput by fetching instructions on the correct execution path at the front end of the pipeline.

BRIEF DESCRIPTION OF THE DRAWINGS

FIGS. 4A-4C are flow diagrams illustrating example techniques for allocating and training entries in a history-based next fetch predictor, according to some embodiments.

DETAILED DESCRIPTION

Certain execution patterns may be challenging for certain predictors. For example, next fetch predictors that do not incorporate branch history may have mispredictions for certain patterns. As examples, indirect branches with multiple targets and fetch groups with multiple branches in certain combinations may traditionally have a relatively higher misprediction rate in single-cycle predictors, relative to other patterns.

In disclosed embodiments, a next fetch predictor incorporates branch history information to predict next fetch addresses. This may be referred to as a history-based next fetch predictor (NFP HIST) and may advantageously provide more accurate predictions for the patterns discussed above, among others.

In some embodiments, the NFP HIST utilizes branch history as part of an index into an NFP HIST table and as part of a tag. Further, the NFP HIST may use different types of history for the index and tag, such as global history (that is based on targets of multiple taken branches) and path history (that is based on program counter values of multiple taken branches). Utilizing these types of branch history may be advantageous over other history encodings (e.g., relative to a sequence of taken/not-taken bits for a given branch).

In some embodiments, a not-taken (NT) NFP history-based predictor (NT NFP HIST) is configured to predict that certain fetch groups include no taken branches. The NT NFP may operate alone or in conjunction with the NFP HIST. This may advantageously allow fetching to properly proceed sequentially when one or more other predictors would have mispredicted a branch as taken.

In various embodiments, one or more predictors are configured to predict the direction and target of control transfer instructions (e.g., branches). It is noted that throughout this disclosure, the terms "control transfer instruction," "program flow instruction" and "branch instruction" may be used interchangeably. Such instructions include at least conditional branch instructions, call instructions, return instructions, jump instructions, etc. Additionally, while the term "branch instruction" or (or more briefly, "branch") may be used throughout this disclosure, it should be understood that the term applies to any type of control transfer instruction that may be utilized in an instruction set architecture.

Overview of Example Next Fetch Predictor

Figure 1:
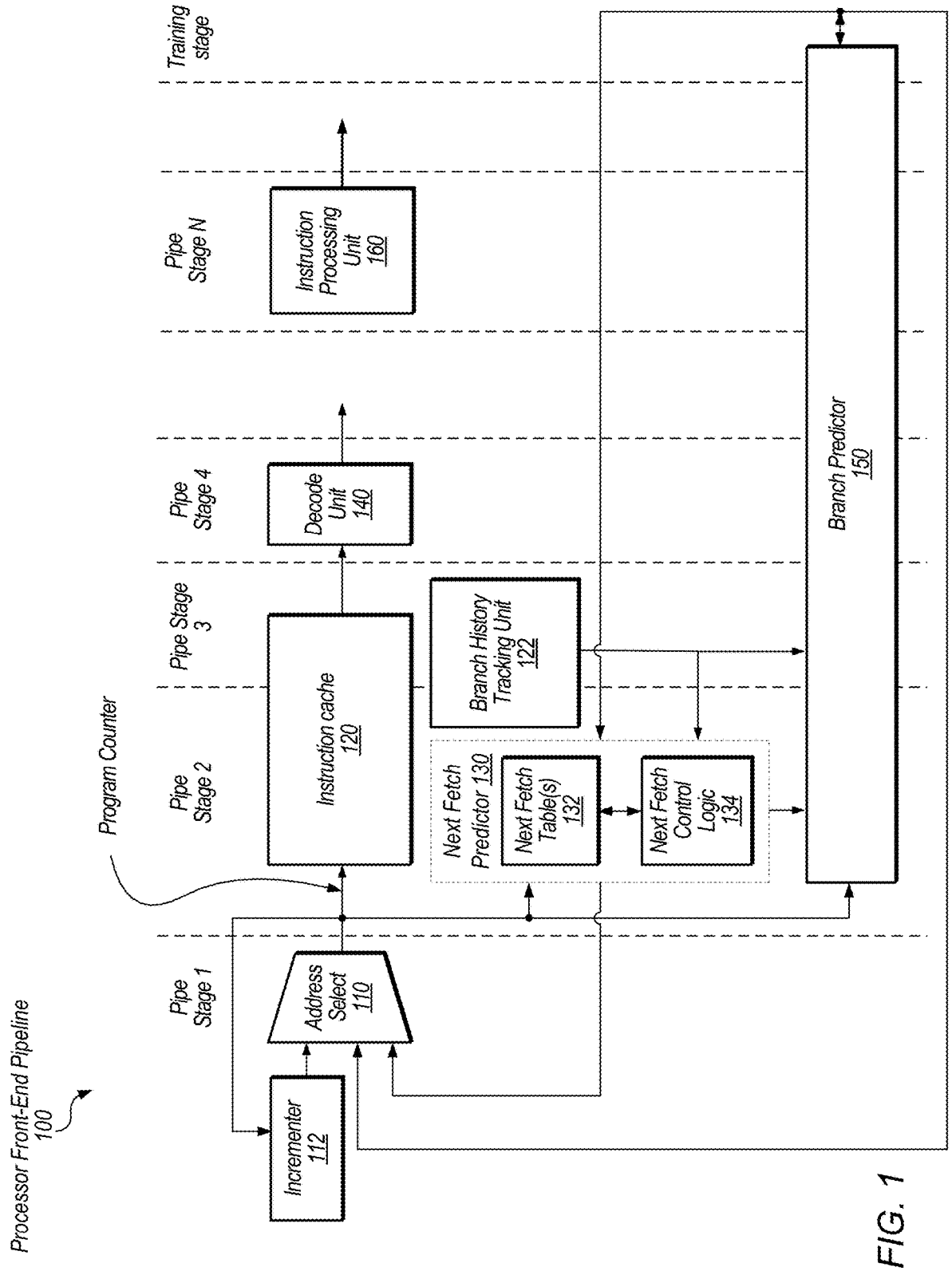
FIG. 1 is a block diagram illustrating an example pipeline that includes a next fetch predictor, according to some embodiments.

FIG. 1 is a generalized block diagram illustrating one embodiment of a front-end pipeline 100 of a processor is shown. In the embodiment shown, pipeline 100 is a multi-stage pipeline for the processing of instructions. A processor "pipeline" may be used to split the "work" a processor performs on instructions into multiple stages. In one embodiment, instruction decode, dispatch, execution, and retirement may be examples of different pipeline stages. Various pipeline stages perform such steps on an instruction during one or more processor clock cycles and then pass the instruction and/or operations associated with the instruction on to other stages for further processing. Many different pipeline architectures are possible with varying orderings of elements. In one embodiment, the front-end pipeline 100 is included in one or more processor core pipelines of a central processing unit (CPU). It is also noted that the ordering of pipeline stages in FIG. 1 is intended to be representative of one embodiment and not to exclude other implementations.

An instruction cache 120 may store instructions for a software application (e.g., a user application, operating system) executing on the processor. One or more instructions indicated by a program counter (PC) address conveyed by the address selector 110 are fetched (i.e., retrieved) from the instruction cache 120. Multiple instructions may be fetched from the instruction cache 120 per clock cycle if there are no instruction cache misses (i.e., the requested instructions are currently located in instruction cache 120). In certain embodiments, the processor may implement an address translation scheme allowing one or more virtual address spaces to be made visible to executing software.

Memory accesses within the virtual address space may be translated to a physical address space corresponding to the actual physical memory available to the processor. In embodiments of processors that employ address translation, instruction cache 120 may be partially or completely addressed using physical address bits rather than virtual address bits. For example, in one embodiment, instruction cache 120 may use virtual address bits for cache indexing and physical address bits for cache tags. In order to avoid the cost of performing a full memory translation when performing a cache access, the processor may store a set of recent and/or frequently used virtual-to-physical address translations in a translation lookaside buffer (TLB), which is not shown in FIG. 1.

In the embodiment shown, the current fetch address supplied to instruction cache 120 comes from address selector 110. In this particular implementation, selector 110 receives four different inputs (other numbers of inputs are possible depending on the embodiment). One input to selector 110 is supplied by incrementer 112, which supplies a next sequential PC address for the next fetch group (i.e., the next PC for the next fetch group assuming there is not a taken branch in the current fetch group). Other inputs are supplied to selector 110 by next fetch predictor 130 (based on one or more next fetch tables 132 and next fetch control logic 134) and branch predictor 126. Next fetch predictor 130 may provide one or more non-sequential PC addresses based on prediction for one or more control transfer instructions in the current fetch group, a sequential PC address based on predicting one or more control transfer instructions are not taken, or both.

As can be seen from the depiction of pipeline stages in FIG. 1 next fetch predictor 130 generates an address prediction prior to predictions generated by branch predictor 126. In some embodiments, next fetch predictor 130 generates an address prediction within a single clock cycle. Some predictors may generate predictions at the granularity of fetch groups (which include multiple instructions and potentially multiple branch instructions), while others (e.g., branch predictor 126) may generate predictions at the granularity of individual branch instructions. In one embodiment, branch predictor 126 may receive at least a portion of the PC address used to fetch instructions from the instruction cache 120. Using this and other information, branch predictor 126 may perform a prediction of the direction and target of a branch instruction that was predicted by next fetch predictor 130.

The prediction of branch predictor 126 may, in many embodiments, be relatively slower (and thus more accurate) than the prediction(s) generated by next fetch predictor 130. Branch predictor 126 may combine, in a separate hash function, at least a portion of the received PC address with another portion of itself or with other values, such as history information provided by branch history tracking unit 122. Various hashing functions may be performed to determine an index to one or more pattern history tables (PHTs), branch target buffers (BTBs), and/or other tables used to provide branch prediction data.

Branch prediction data generated by branch predictor 150 may include a branch direction and a branch target address. The branch predictor 126 may utilize multiple clock cycles to both determine the outcome of the condition of a branch instruction and to determine the branch target address. The branch predictor 126 may thus provide branch prediction data with statistically higher prediction accuracy than next fetch predictor 130. The branch predictor 126 may perform a parallel, slower branch prediction, which may or may not confirm the prediction generated by next fetch predictor 130. For performance reasons, however, it may be desirable to obtain a faster prediction. Therefore, next fetch predictor 130 may be used to provide a quick, initial branch prediction.

In the illustrated embodiment, next fetch predictor 130 provides a predicted next address to instruction cache 120 through address selector 110. In other embodiments, next fetch predictor 130 provides predicted fetch address to instruction cache 120 through other communication paths. In some embodiments, next fetch predictor 130 may access branch prediction information based on the PC address of the current fetch group and/or branch history data supplied by branch history tracking unit 122.

In some embodiments, the next fetch address generated by next fetch predictor 130 may be verified later in the pipeline by comparison to a prediction from the branch predictor 126. The branch predictor 126 may generate branch prediction data at a later time and with higher prediction accuracy. In one embodiment, the prediction data generated by next fetch predictor 130 is stored and staged along the pipeline so as to be made available to various pipeline stages. The staged prediction data may be compared to prediction data generated at a later pipeline stage by the branch predictor 126 or completion data generated from execution and completion of branch instructions.

When next fetch predictor 130 generates branch prediction data that does not match prediction data generated by the branch predictor 126 at a later time, an indication of a misprediction is generated, and multiple stages of the processor pipeline may be flushed and fetches may be restarted at the new address. Additionally, next fetch predictor 130 may be updated or trained with the prediction data generated by the branch predictor 126 (e.g., during the training stage of FIG. 1). Next fetch predictor 130 may be similarly trained at retirement or completion of relevant instructions. Note that the training stage may precede pipeline stage N in some embodiments.

In some embodiments, next fetch predictor 130 stores a strength value with the indications of a fetch address and a next fetch address in a given entry. In various embodiments, the strength value is a combination of a predictive strength and a hysteresis value. In other embodiments, next fetch predictor 130 stores separate values for predictive strength and hysteresis in the given entry. In some embodiments, a value for predictive strength indicates whether the next fetch address (predicted target address) should remain stored in next fetch predictor 130, rather than be replaced with another next fetch address, despite a detected misprediction for the next fetch address. A value for hysteresis may indicate whether the entire entry for the fetch group address (or a portion, thereof) should remain stored in next fetch predictor 130, rather than be replaced with another fetch group address and corresponding data, despite a detected misprediction for the fetch group address.

In one embodiment, the predictive strength is a count of a number of consecutive correct predictions provided by the next fetch address in the entry. The higher the count, the higher the predictive strength. In other embodiments, a lower count indicates a higher predictive strength. In another embodiment, a one-hot mask is used where the location of a bit set to a logical high value in the mask indicates the predictive strength. In other embodiments, the location of a bit set to a logical high value in the mask indicates the predictive strength. Other embodiments are possible and contemplated for indicating the predictive strength. In an embodiment, an indication of hysteresis may indicate a given branch instruction exhibits a frequently alternating pattern regarding its branch direction. Such behavior may lead to branch mispredictions due to the training is being unable to keep up with the changing branch direction. When such a condition is determined to occur, the control logic may prevent training of next fetch predictor 130. In some embodiments, an indication of hysteresis is a single bit stored in the entry.

Rather than store two separate values, such as one value for predictive strength and one value for hysteresis, in some embodiments, next fetch predictor 130 stores a single value to combine predictive strength and hysteresis. The single value is used for indicating whether to replace a next fetch address (target address) during a hit in next fetch predictor 130 and whether to replace the entire entry during a miss in next fetch predictor 130. As used herein, a "strength value" or "useful value" refers to a value indicating a probability the stored fetch group address provides a useful prediction such as the next fetch address. When a given entry in the first predictor stores a strength value above a threshold, the fetch group address stored in the given entry is considered to be relatively strong for providing a useful prediction such as the next fetch address (target address) also stored in the given entry. The probability the next fetch address provides a correct prediction for where to branch in program code to continue instruction processing is relatively high. When the given entry in the first predictor stores a strength value below a threshold, the fetch group address stored in the given entry is considered to be relatively weak for providing a useful prediction such as the next fetch address (target address) also stored in the given entry.

In some embodiments, the strength value is represented by a saturating counter. The higher the count, the higher the strength. In other embodiments, a lower count indicates a higher strength. In another embodiment, a one-hot mask is used where the location of a bit set to a logical high value in the mask indicates the strength. In other embodiments, the location of a bit set to a logical high value in the mask indicates the strength. Other embodiments are possible and contemplated for indicating the strength. Therefore, the access result, such as a hit or a miss, combined with the strength value determines whether to replace the next fetch address in a given entry, replace the entire given entry, or allow the given entry to remain. The access result also determines whether to increase or decrease the strength value if the given entry is not replaced.

In response to a misprediction, in an embodiment, the corresponding strength value is reduced (weakened). As described above, in one embodiment, the strength value is a saturating count. In one embodiment, correct predictions increase the count, whereas, mispredictions decrease the count. In other embodiments, a lower count indicates a higher strength. In another embodiment, a one-hot mask is used where the location of a bit set to a logical high value in the mask indicates the predictive strength. Other embodiments are possible and contemplated for indicating the predictive strength.

In various embodiments, when a misprediction (mismatch) occurs, control logic, such as logic 134 may train next fetch predictor 130. Training may include updating stored values in one or more tables of next fetch predictor 130 with the branch prediction data generated by the branch predictor 126.

In some embodiments, multiple tables of next fetch predictor 130 receive a current fetch group address at the same time. Each table may perform a lookup. When the multiple lookup operations result in a hit for two or more tables, a priority scheme in the control logic determines from where address selector 110 (and/or an internal selector implemented by control logic 134) receives a prediction to be used as the next fetch group address. For example, in an embodiment, processor front-end pipeline 100 includes selection logic prior to address selector 110 which selects between predictions. Therefore, only a single prediction is provided to address selector 110 from next fetch predictor 130, in some embodiments. Note that arbitration may also occur among multiple next fetch predictors each having one or more tables. However, other priority schemes are possible and contemplated.

In one embodiment, next fetch predictor 130 includes a table including multiple entries, with each entry storing at least a current fetch address (or a portion thereof), and a prediction of the next fetch address. In some embodiments, each entry additionally stores a width of data to fetch with the next fetch address. In some embodiments, each entry is accessed based on branch history data (e.g., using branch history data to determine index, tag, or both for a given access). In various embodiments, one or more tables 132 in next fetch predictor 130 are stored in an array. In some embodiments, one or more tables 132 in next fetch predictor 130 are stored in a set-associative cache.

Each fetch group may include up to 'N' instructions, wherein 'N' may vary from embodiment to embodiment and from fetch group to fetch group, and wherein 'N' is a positive integer. Some fetch groups may include more than one branch instruction, resulting in the fetch group having multiple potential targets. In some embodiments, only a single fetch group address (or a portion, thereof) is stored in a next fetch table with a corresponding next fetch address. Replacing the next fetch address with another next fetch address may occur after a misprediction is detected and after determining a strength value representing a combination of the predictive strength and hysteresis falls below a threshold. In another embodiment, next fetch predictor 130 may include a dual-tag table structure which includes a fetch group address tag and a branch history tag (not shown) for each entry of the table so as to disambiguate between the multiple branches in a fetch group.

In one embodiment, when next fetch predictor 130 receives a current fetch group address, next fetch predictor 130 may perform a lookup of the fetch group address tag field of the table using the current fetch group address. If the lookup results in a hit to a single entry, then next fetch predictor 130 may convey the prediction from the hit entry to address selector 110 to be used as the next fetch group address. It is noted that while tables are generally described as array or associative type structures, those skilled in the art will appreciate that a variety of types of structures are possible. Numerous types of structures are possible and are contemplated.

When the lookup for next fetch predictor 130 results in a miss, next fetch predictor 130 searches for an empty entry for allocation. However, if no empty entry is found, then next fetch predictor 130 identifies one or more candidate entries for allocation. In some embodiments, next fetch predictor 130 includes an array with a set associative arrangement. For example, the array in next fetch predictor 130 is an n-way set associative data structure where 'n' is a positive integer. In an embodiment, the candidate entries for allocation are the 'n' ways within the set selected during lookup.

Decode unit 140 may, in some embodiments, decode the opcodes of the multiple fetched instructions. Decode unit 140 may send the instructions with additional decoded information to other components in the processor for instruction processing in later pipeline stages. These later pipeline stages are generically represented by instruction processing unit 160. For example, the decode unit 140 may allocate entries in a dispatch queue. Register renaming, instruction scheduling, executing arithmetic operations and/or performing memory accesses, and in-order retiring are just some examples of later instruction processing steps. In one embodiment, decode unit 140 may forward data to a later pipeline stage while bypassing other pipeline stages. For example, decode unit 140 may decode branch instructions and forward decoded instruction information to next fetch predictor 130 and/or branch predictor 126.

Branch history tracking unit 122 may be configured to track the branch history of instructions executed by the host processor. Branch history tracking unit 122 may use any of various techniques for monitoring and storing history data associated with the branches being executed by the processor. For example, in one embodiment, branch history tracking unit 122 may track the taken/not-taken status of each branch being fetched and executed by the processor. The taken/not-taken status may be encoded with a '1' for taken and a '0' for not taken.

In another embodiment, branch history tracking unit 122 may track the taken/not-taken status of each branch and the target of each taken branch. Branch history tracking unit 122 may encode the data into a combined bit stream and then provide this bit stream (or a portion thereof) to next fetch predictor 130 and branch predictor 126.

In some embodiments, branch history tracking unit 122 is configured to hash a current history value with address information relating to taken or not-taken branches, such as PC's of branches, targets of branches, etc.

Other techniques for tracking and storing branch history data by branch history tracking unit 122 are possible and are contemplated.

Example Next Fetch Predictor History-Based Table

Figure 2:
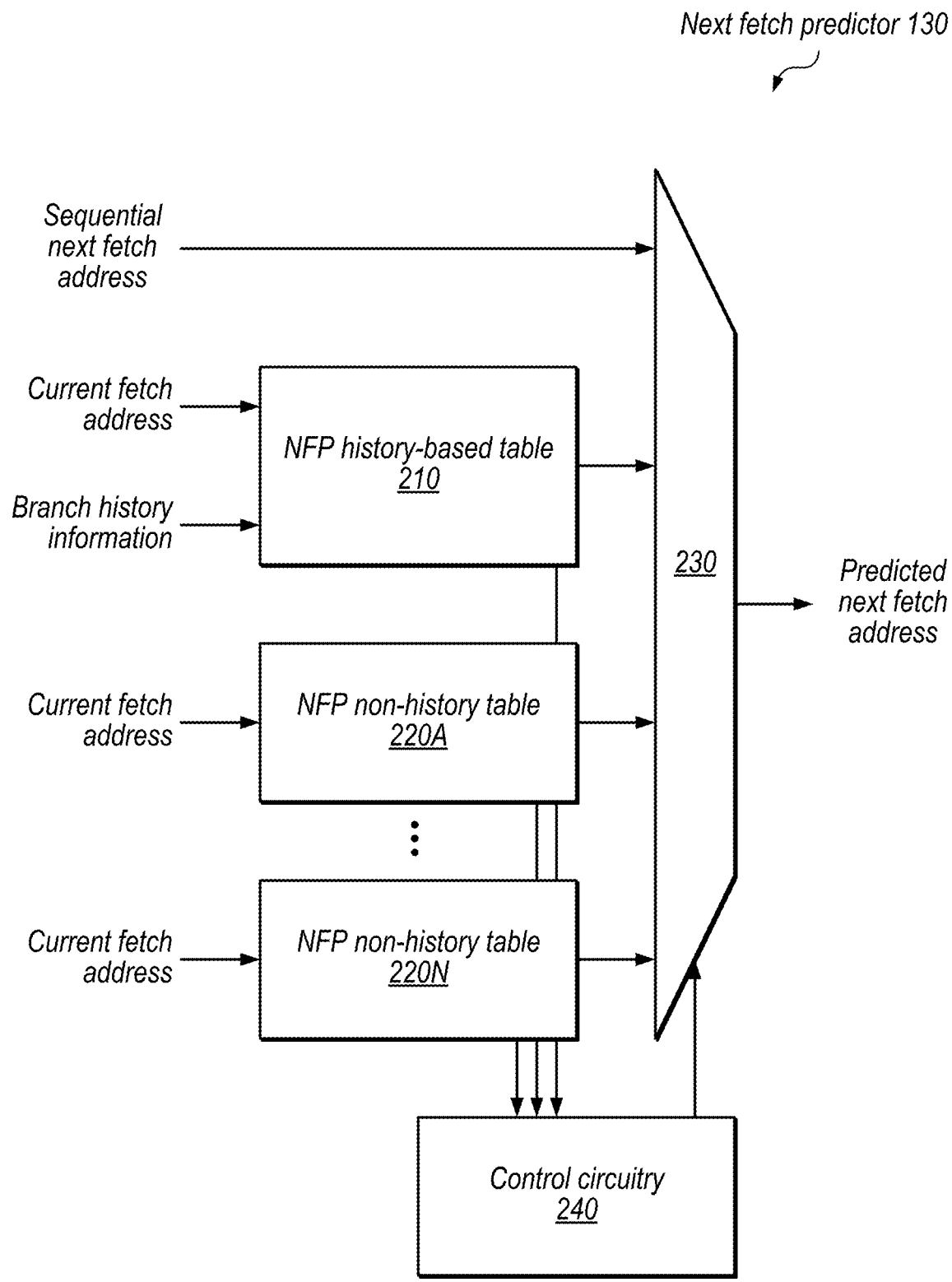
FIG. 2 is a block diagram illustrating example next fetch predictor tables, at least one of which is history-based and at least one of which is not history-based, according to some embodiments.

FIG. 2 is a diagram illustrating an example next fetch predictor that includes a history-based table, according to some embodiments. In the illustrated example, next fetch predictor 130 includes NFP history-based table 210, one or more NFP non-history tables 220A-220N, selection circuitry 230 (e.g., a multiplexer), and control circuitry 240.

As shown, next fetch predictor 130 is configured to provide a predicted next fetch address from among the sequential next fetch address and predicted fetch addresses from the tables 210 and 220A-220N. Note that the sequential next fetch address may be the current PC plus an increment amount that is based on the number of instructions in a fetch group of instructions that are fetched in a given cycle. Further note that some tables may not have a hit in a given cycle and therefore may not provide a predicted next fetch address.

NFP non-history tables 220A-220N, in the illustrated example, receive the current fetch address as input and do not receive branch history information. In some embodiments, multiple tables are included to predict for different types of control transfers, as overflow for other tables, etc. In other embodiments, a single NFP non-history table is implemented.

NFP history-based table 210, in the illustrated embodiment, receives the current fetch address and branch history information and generates a predicted next fetch address. Detailed example fields and control circuitry for table 210 are discussed in detail below with reference to FIG. 3. Incorporating branch history information may allow table 210 to provide more accurate predictions for certain code scenarios than tables 220A-220N.

Control circuitry 240, in the illustrated embodiment, receives output information from tables 210 and 220A-220N. This output information may indicate whether there is a hit in a given table, the confidence level for a hit in a given table, etc. Control circuitry 240 is configured to select a table (or the sequential next fetch address) to provide the predicted next fetch address for a given cycle.

When multiple tables have hits in a given cycle, control circuitry 240 may implement a priority scheme to select one of the tables to make a prediction. In some embodiments, history-based table 210 overrides all non-history tables 220 when it has a hit. The output of next fetch predictor 130 may also be arbitrated among predictions from other predictors (e.g., branch predictor 150). Selection among tables in next fetch predictor 130 may occur at a separate level than such selection among predictors (as shown) or may be combined with such selection.

In some embodiments, next fetch predictor 130 includes separate history-based tables for predicting taken branches and not-taken branches. In these embodiments, a not-taken history-based table may have priority over the taken history-based table, at least in some scenarios. Examples embodiments of a not-taken history-based table are discussed below with reference to FIGS. 5A-5B.

Note that while FIG. 2 shows multiple non-history tables and one history table, other embodiments may include a single non-history table and multiple history tables, a single instance of each type of table, multiple instances of each types of table, etc.

Example Branch-History-Based NFP Fields and Allocation/Training Techniques

Figure 3:
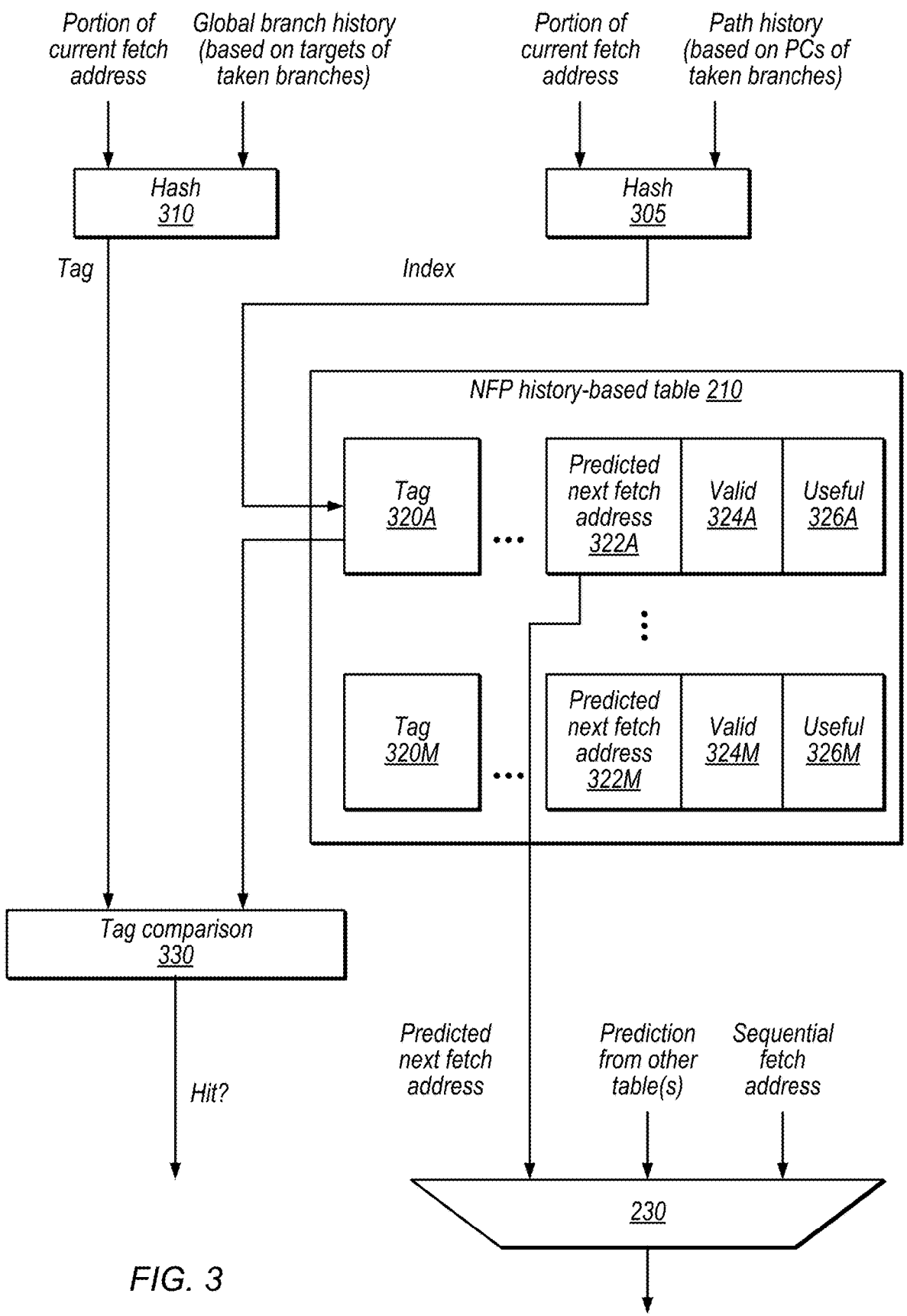
FIG. 3 is a block diagram illustrating detailed example history-based next fetch predictor fields and control circuitry, according to some embodiments.

FIG. 3 is a block diagram illustrating example fields and control circuitry for NFP history-based table 210, according to some embodiments. In the illustrated embodiment, next fetch predictor 130 includes NFP history-based table 210, hash circuitry 305 and 310, tag comparison circuitry 330, and selection circuitry 230.

NFP history-based table 210, in the illustrated example, includes multiple entries. The entries include the following fields in this example: tag 320, predicted next fetch address 322, valid 324, and useful 326. In some embodiments, NFP history-based table 210 is direct-mapped, but other topologies may be used in other embodiments (e.g., set associative or even fully associative, in which case an index may not be generated).

The tag field 320 may correspond to a hash of the current fetch PC and a portion of the global branch history, as discussed in detail below. The predicted next fetch address 322 may be populated during training of table 210 based on prior branch targets for a similar fetch PC and history situation. Valid field 324 may indicate whether an entry is valid for making predictions. Entries may be invalidated based on incorrect predictions, maintained as invalid during training, etc. Useful field 326 (which may also be referred to herein as a "use" field) may be used to control retention of entries in table 210 based on their use (and potentially based on use of other entries) as discussed in detail below. Useful field may be a multi-bit field with 2, 3, or 4 bits, for example (or any appropriate number of bits).

Hash circuitry 305, in the illustrated example, is configured to generate an index into table 210. In particular, hash circuitry 305 hashes a portion of the current fetch address with path history information that is based on program counters of taken branches in the execution path. For example, hash circuitry 305 may be configured to perform an exclusive-or operation between set of bits of the fetch address of the current fetch group and all or a portion of the bits of the path history. As one specific example, the path history may be an M+N bit value that is shifted left by one and XOR'd with N bits of the fetch address of the current fetch group to generate the next path history value each cycle, according to the following example equation:

$$\text{path\_hist}[M+N-1:0]=\{\text{path\_hist}[M+N-2:0], 1'b0\}\hat{\ }\{M'b0,N\_bits\_of\_PC\}$$

The generated index is used to identify an entry in table 210. Note that the N bits of the fetch address PC may or may not be contiguous and may be located at different positions within the address in different embodiments.

Hash circuitry 310, in the illustrated example, is configured to generate a tag for comparison with a tag of the identified entry in table 210. In particular, hash circuitry 310 hashes a portion of the current fetch address (which may be different and partially overlapping or non-overlapping with the portion input to hash circuitry 305) with a global branch history that is based on targets of taken branches in the execution path. For example, hash circuitry 305 may be configured to perform an exclusive-or operation between set of bits of the fetch address of the current fetch group and all or a portion of the bits of the global branch history.

As one specific example, the global history may be an X+Y bit value that is shifted left by one and XOR'd with Y bits of the fetch address of the current fetch group to generate the next path history value each cycle, according to the following example equation:

$$\text{global\_hist}[X+Y-1:0]=\{\text{global\_hist}[X+Y-2:0], 1'b0\}\hat{\ }\{X'b0,Y\_bits\_of\_target\}$$

Note that the Y bits of the target may or may not be contiguous and may be located at different positions within the address in different embodiments. In some embodiments, the Y-bit portion of the current fetch address input to hash circuitry 310 is different than the N-bit portion of the current fetch address input to hash circuitry 305. In some embodiments, Y-bit portion includes one or more bits that are more significant than any bits included in the N-bit portion. The N-bit and Y-bit portions may or may not overlap. The number of bits implemented for M, N, X, Y, etc. may affect the length of history used, control circuit area, the impact of a given address on the current history value, etc. These parameters may vary in different embodiments.

In other embodiments, various other branch history encodings may be implemented. In some embodiments, a single type of history may be used as a hash input to generate both the tag and index. In some embodiments, other types of history may be used (e.g., a bit field that indicates the taken/not-taken history for a single branch, although disclosed encodings that consider multiple branches may provide better accuracy). In some embodiments, branch history information may be used as an input to only one of the index or tag, but not both.

Tag comparison circuitry 330, in the illustrated embodiment, is configured to compare the tag of the indexed entry to the tag from hash circuitry 310. On a match when the valid field 324 is set, tag comparison circuitry may signal a hit and selection circuitry 230 may select the predicted next fetch address from the indexed entry's field 322, assuming it has highest priority among the inputs to selection circuitry 230 for the current cycle.

FIGS. 4A-4C illustrate example allocation and training techniques for table 210, according to some embodiments.

Referring to FIG. 4A, a front-end redirect occurs at 402. This may be due to a mispredicted branch, for example. In response to the redirect, control circuitry attempts to allocate an entry for the fetch PC prior to the mispredicted branch in table 210. Note that other NFP tables may also be trained in parallel, in this situation.

If there is a failure to allocate at 404 (e.g., due to a valid entry at the corresponding index with a useful field above a threshold), flow proceeds to 408 and control circuitry adjusts useful fields for all valid entries (e.g., decrements the useful fields). If allocation is successful, flow proceeds to 406 and control circuitry sets an initial useful value for the allocated entry (where the initial value may be between lowest and highest representable values for the useful field).

Referring to FIG. 4B, in response to a correct prediction at 412 by table 210, control circuitry adjusts (e.g., increments) the useful field at 414. If table 210 makes a correct prediction, useful fields for other tables may remain the same, whether or not those tables made a correct prediction.

Referring to FIG. 4C, in response to a hit in table 210 where the prediction was incorrect (a misprediction) at 422, control circuitry determines at 424 whether the corresponding fetch group includes a taken branch. If not, flow proceeds to 426 and control circuitry invalidates the entry or adjusts (e.g., decrements) the useful field. If so, flow proceeds to 428 and control circuitry updates field 322 of the entry to reflect the target of the taken branch or adjusts (e.g., decrements) the useful field.

In some embodiments, the processor is configured to always invalidate the entry at 426 or always adjust the useful field. Similarly, at 428 the processor may be configured to always update the target or always adjust the useful field. In other embodiments, the processor may determine whether to perform one action or the other depending on other parameters. For example, at 428 the control circuitry may check for a useful field value below a threshold before determining to update the target and adjust the useful field if the value is not below the threshold.

Generally, various corrective actions may be taken in response to different types of mispredictions in various embodiments, including adjusting a useful field (potentially by different amounts for different events), invalidating an entry, updating the target, etc.

Disclosed techniques may generally retain useful entries in table 210 while invalidating or replacing less useful entries. Note that the disclosed fields, allocation techniques, and training techniques are included for purposes of illustration but are not intended to limit the scope of the present disclosure. Various other techniques may be implemented in the context of a history-based single-cycle predictor. As one example, the useful field may be encoded using other techniques, such as using separate least-recently-used (LRU) and confidence/strength fields to encode similar information for purposes of invalidation/replacement.

Example Branch-History-Based not-Taken (NT) NFP Predictor

Figure 5A:
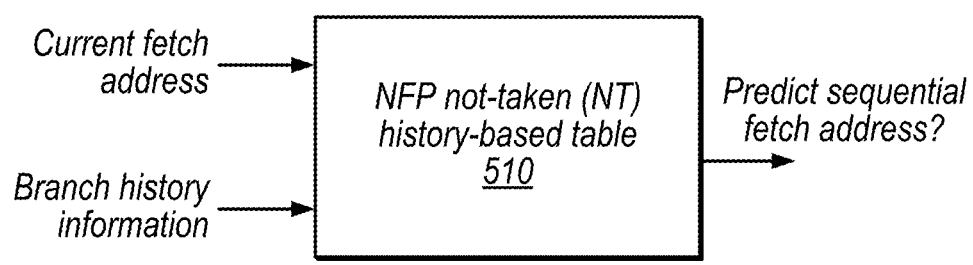
FIG. 5A is a block diagram illustrating an example history-based not-taken (NT) next fetch predictor table, according to some embodiments.

FIG. 5A is a block diagram illustrating an example not-taken history-based predictor table, according to some embodiments. In the illustrated embodiment, table 510 is accessed based on the current fetch address and branch history information. On a hit, table 510 predicts that the current fetch group does not include a taken branch.

In some embodiments, table 510 tracks only fetch groups that do not include a taken branch, which may reduce the circuit area of table 510 relative to tracking other types of fetch groups. Table 510 may advantageously allow prediction of low iteration count loop exits and dynamic not-taken fetch groups with better accuracy than tables 210 and 220, for example.

In some embodiments, table 510 operates in parallel with table 210. If there is a hit in both tables, table 510 may have higher priority, at least in some situations (e.g., if a hit entry in table 510 meets a threshold usefulness value). In other embodiments, table 510 may replace table 210. In some embodiments, table 510 is tagged and indexed similarly to table 210 as discussed above (thus, the illustrated inputs to FIG. 5A may be hashed by control circuitry before being used to actually access the table; the direct inputs are shown for purposes of illustrating the types of inputs used to access the table but are not intended to limit the scope of the disclosure). Note that the specific bit fields from the history and current fetch group PC may or may not be different for different tables.

Figure 5B:
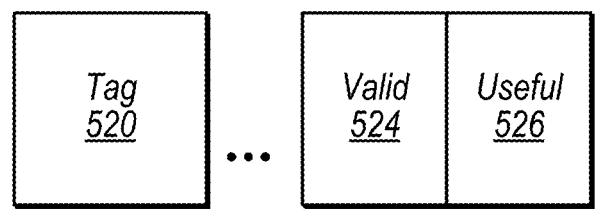
FIG. 5B is a diagram illustrating example fields of an entry in a history-based NT next fetch predictor table, according to some embodiments.

FIG. 5B is a diagram illustrating example fields that may be included in respective entries of table 510, according to some embodiments. The tag 520, valid 524, and useful 526 fields may operate similarly to fields 320, 324, and 326 of FIG. 3. Note that entries of table 510 may not need a predicted-next-fetch-address field, because hits in table 510 indicate a sequential next PC for the next fetch group that can be generated using a fixed increment (e.g., PC+N where N corresponds to the width of a fetch group).

Figure 6A:
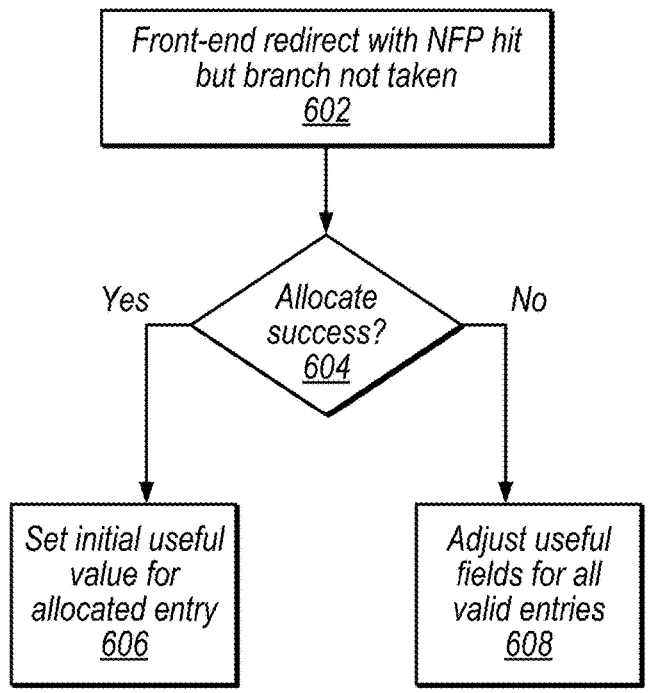
FIGS. 6A-6C are flow diagrams illustrating techniques for allocating and training entries in a history-based NT next fetch predictor table, according to some embodiments.
Figure 6B:
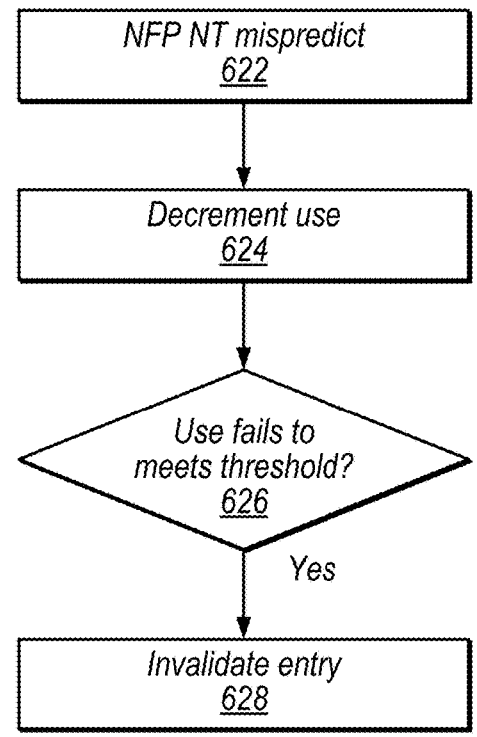
Figure 6C:
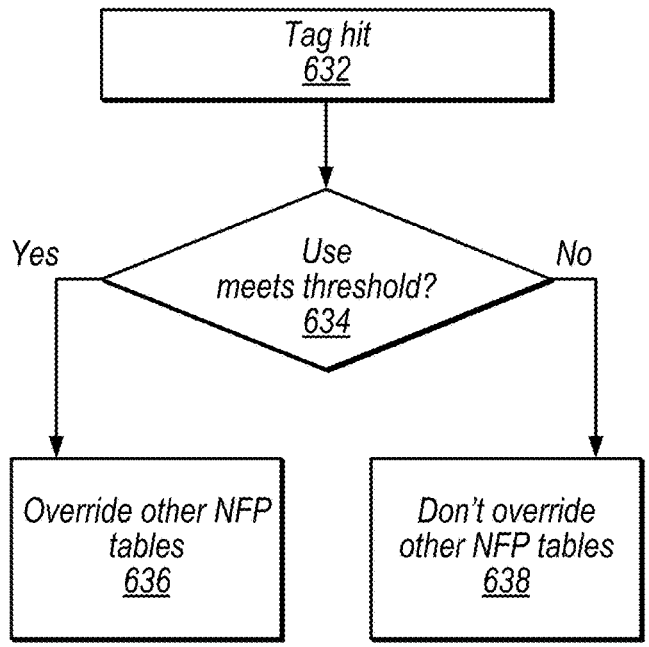

FIGS. 6A-6C are flow diagrams illustrating example allocation and training techniques for table 510, according to some embodiments.

Referring to FIG. 6A, a front-end redirect occurs at 602. In this example, there was a next fetch predictor hit (in another NFP table) but the branch was not actually taken, causing the redirect. Control circuitry attempts to allocate an entry in 510. If the allocation is successful at 604, flow proceeds to 606 and the control circuitry sets an initial useful value for the allocated entry. This initial value may vary in different embodiments. If the allocation is not successful (e.g., due to a valid entry at the corresponding index with a useful field above a threshold), flow proceeds to 608 and the control circuitry adjusts (e.g., reduces) useful fields for all valid entries in table 510. This may cause other entries to be invalidated, making room for new entries to be allocated.

Referring to FIG. 6B, in response to a misprediction by table 510 at 622, control circuitry decrements the useful field of the corresponding entry at 624. If the use fails to meet a threshold after the decrement at 626, control circuitry invalidates the entry at 628.

Referring to FIG. 6C, in response to a tag hit at 632, control circuitry determines whether the useful field of the hit entry meets a threshold at 634. If so, the hit overrides the other NFP tables at 636 and the next fetch predictor 130 predicts a sequential next fetch address. If not, table 510 does not override other NFP tables at 638. In this scenario, table 510 may still provide a prediction if there are no hits in other tables, but a taken branch may be predicted if there is a hit in another table. This concept of strong/weak hits based on whether the useful field meets a threshold may improve prediction accuracy, e.g., by addressing a history saturation problem with high iteration loops counts.

In other embodiments, various appropriate encodings of confidence, replacement policies, etc. may be implemented. The disclosed techniques are included for purposes of explanation but are not intended to limit the scope of history-based not-taken prediction in other embodiments.

Example Method

Figure 7:
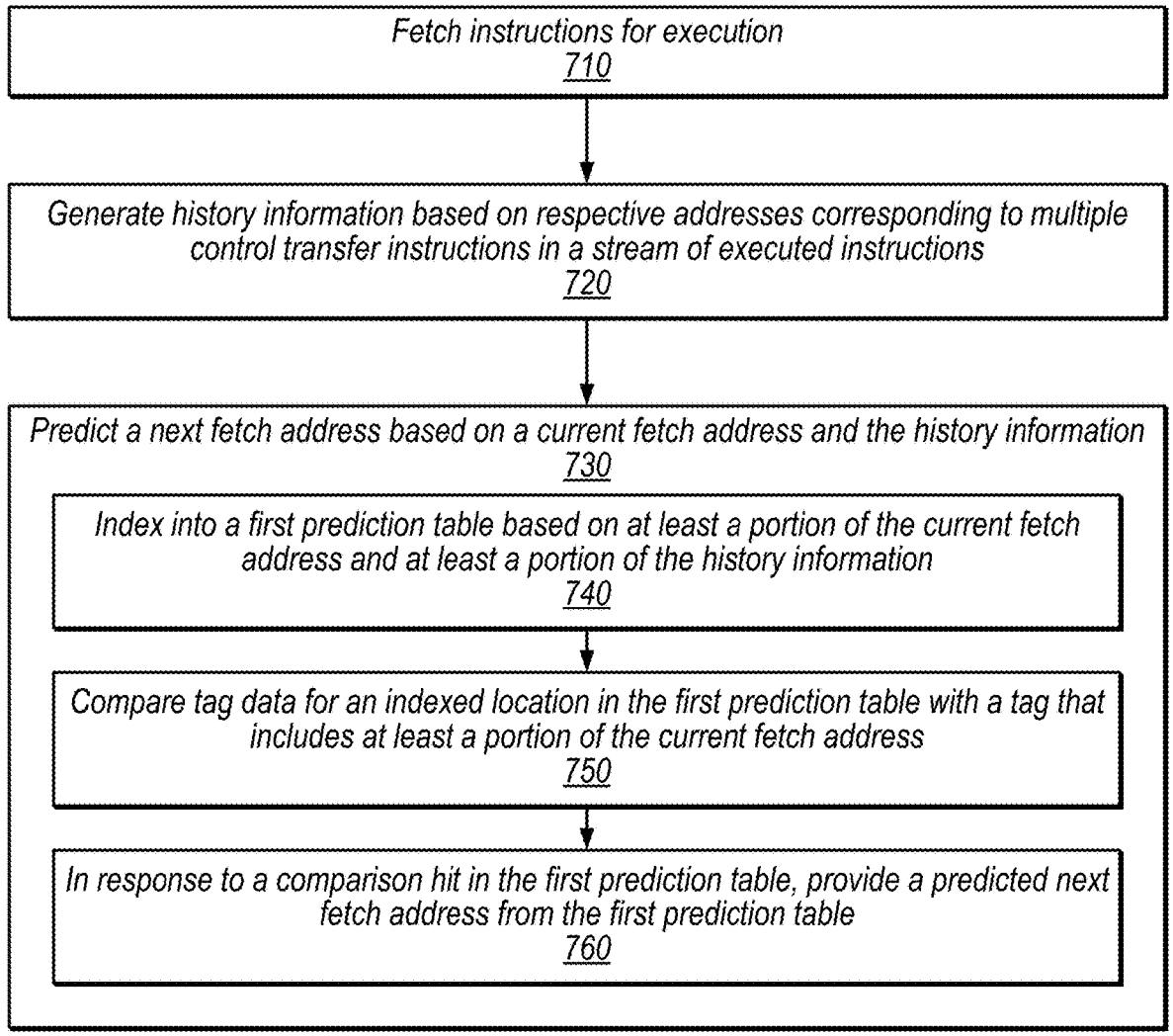
FIG. 7 is a flow diagram illustrating an example method, according to some embodiments.

FIG. 7 is a flow diagram illustrating an example method for next fetch prediction, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a computing device (e.g., fetch circuitry) fetches instructions for execution.

At 720, in the illustrated embodiment, the computing device (e.g., tracking circuitry such as branch history tracking unit 122) generates history information based on respective addresses corresponding to multiple control transfer instructions in a stream of executed instructions. Note that an address "corresponding" to a given control transfer instruction may refer to the address of the control transfer instruction itself (e.g., as used to generate path history) or the target address of the control transfer instruction (e.g., as used to generate global branch history).

In some embodiments, to generate the history information, tracking circuitry is configured to left-shift a current history value and perform a hash operation on the left-shifted current history value and address information corresponding to a taken control transfer instruction.

At 730, in the illustrated embodiment, the computing device (e.g., prediction circuitry such as next fetch predictor 130) predicts a next fetch address based on a current fetch address and the history information. In the illustrated embodiment, this includes elements 740, 750, and 760.

At 740, in the illustrated embodiment, the computing device indexes into a first prediction table based on at least a portion of the current fetch address and at least a portion of the history information.

At 750, in the illustrated embodiment, the computing device compares tag data for an indexed location in the first prediction table with a tag that includes at least a portion of the current fetch address. In some embodiments, the tag data further includes history information based on respective addresses corresponding to multiple control transfer instructions.

In some embodiments, the history information included in the tag data is first history information that is based on target addresses of taken control transfers in the stream of executed instructions and the history information used to index into the first prediction table is path history information based on program counters of taken control transfers in the stream of executed instructions. Note that global branch history and path history are both examples of branch history information. In some embodiments, to generate the tag data, the prediction circuitry is configured to hash the first history information and the at least a portion of the current fetch address and to generate the index into the first prediction table, the prediction circuitry is configured hash the path history information and the at least a portion of the current fetch address.

At 760, in the illustrated embodiment, the computing device, in response to a comparison hit in the first prediction table, provides a predicted next fetch address from the first prediction table.

In some embodiments, the prediction circuitry is further configured to access a second prediction table based on at least a portion of the current fetch address to generate another predicted next fetch address, where the second prediction table does not use control transfer history information. In response to a hit in both the first prediction table and the second prediction table, control circuitry may select the predicted next fetch address from the first prediction table for a given cycle.

In some embodiments, the first prediction table is configured to store predictions that fetch groups of one or more instructions do not include any taken control transfer instructions and the prediction circuitry is configured to train the first prediction table in response to a redirect due to a predicted-taken control transfer instruction. In other embodiments, the first prediction table is configured to store predictions for taken control transfer instructions.

In some embodiments in which the first prediction table is configured to predict not-taken branches, the prediction circuitry is further configured to index into a second prediction table based on at least a portion of the current fetch address and at least a portion of the history information, where the second prediction table is configured to store predictions of taken control transfer instructions. In these embodiments, the first prediction table may have priority over the second prediction table in at least some scenarios (e.g., when the confidence level for the hit in the first prediction table is above a threshold).

In some embodiments, the first prediction table includes a usefulness field and the prediction circuitry is configured to adjust the usefulness field for an entry in response to adjustment trigger events. In some embodiments, in response to a hit in the first prediction table when the usefulness field meets a threshold, the first table may override one or more other prediction tables. In some embodiments, in response to a hit in the first prediction table when the usefulness field does not meet the threshold, control circuitry may utilize the predicted next fetch address from the first prediction table only if there is not a hit in the one or more other prediction tables.

In some embodiments, prediction circuitry is configured to allocate an entry in the first prediction table in response to a redirect for a fetch group that did not hit in the first prediction table and the first prediction table includes a usefulness field. In some embodiments, the prediction circuitry is configured to adjust the usefulness field for an entry in response to: a correct prediction, a mis-prediction by the prediction circuitry, using another table, that did not hit in the first prediction table, and a failure to allocate an entry. In some embodiments, the prediction circuitry is configured to invalidate an entry in the first prediction table in response to a misprediction based a hit in the first prediction table.

In some embodiments, the prediction circuitry is configured to update a target of an entry in the first prediction table in response to a mis-predict by the first prediction table for a fetch group that includes a taken control transfer instruction.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

For a given program or portion of a program, flow typically proceeds in a sequential fashion. Consider the following group of instructions: ld mem1→r1; add r1, r2→r3; st r3→mem2. In this exemplary sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of instructions with certain opcodes potentially affects the selection of the next instruction to be executed and completed. These instructions are referred to herein as "control transfer instructions." Control transfer instructions may include, without limitation, branches, jumps, calls, returns, etc.

Instructions of these types can cause a change in the default behavior of the next instruction to be executed and completed. Control transfer instructions may be used, for example, to execute a loop of instructions.

There may also be many different types of control transfer instructions. For example, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may have effects on processor state other than on the location of the next instruction (e.g., there might be an instruction that branches after performing an arithmetic operation).

Example Device

Figure 8:
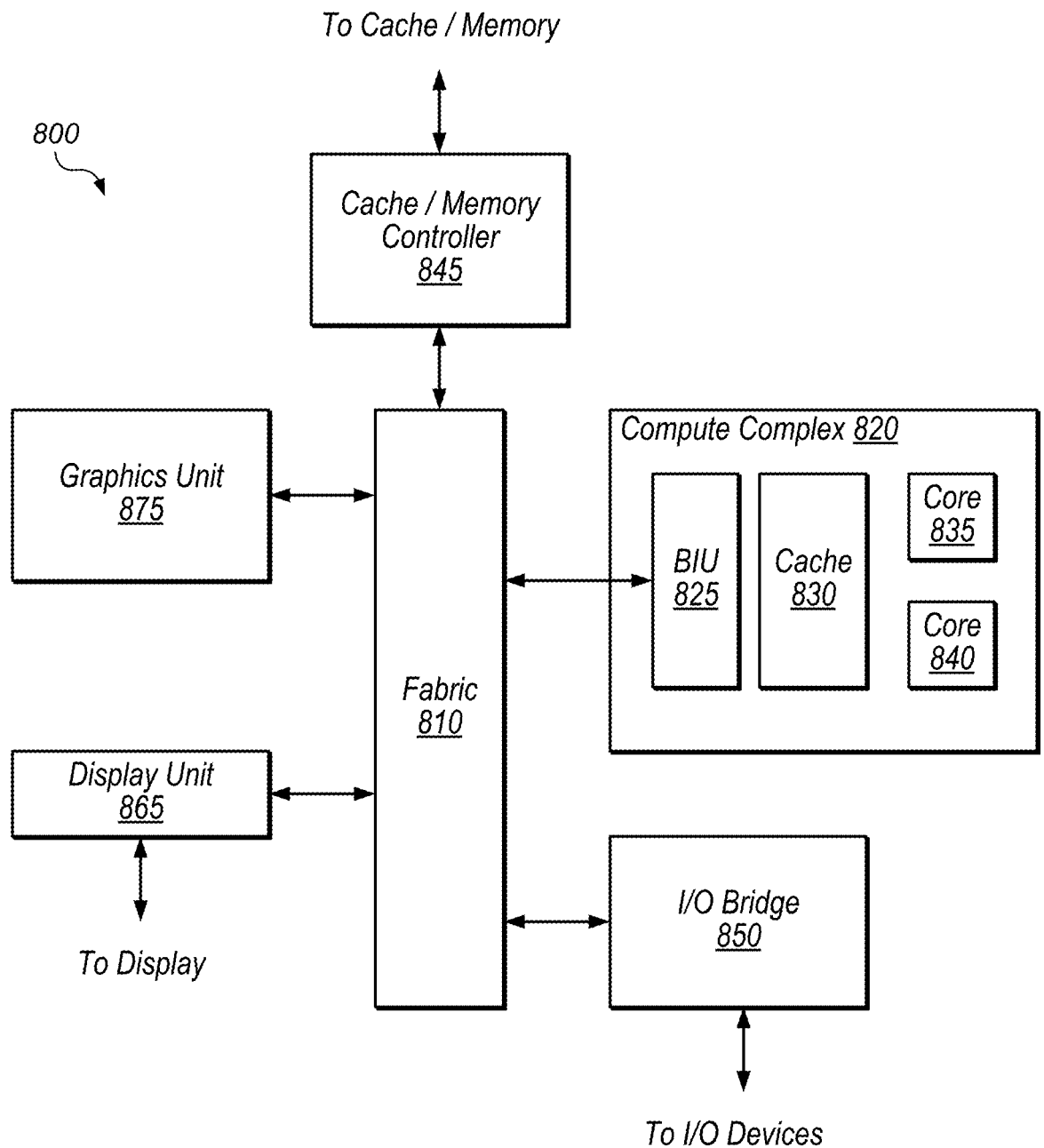
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Disclosed techniques may advantageously improve performance, reduce power consumption, or both for a given processor core in compute complex 820.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques are implemented in non-CPU processors such as in graphic unit 875.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Figure 9:
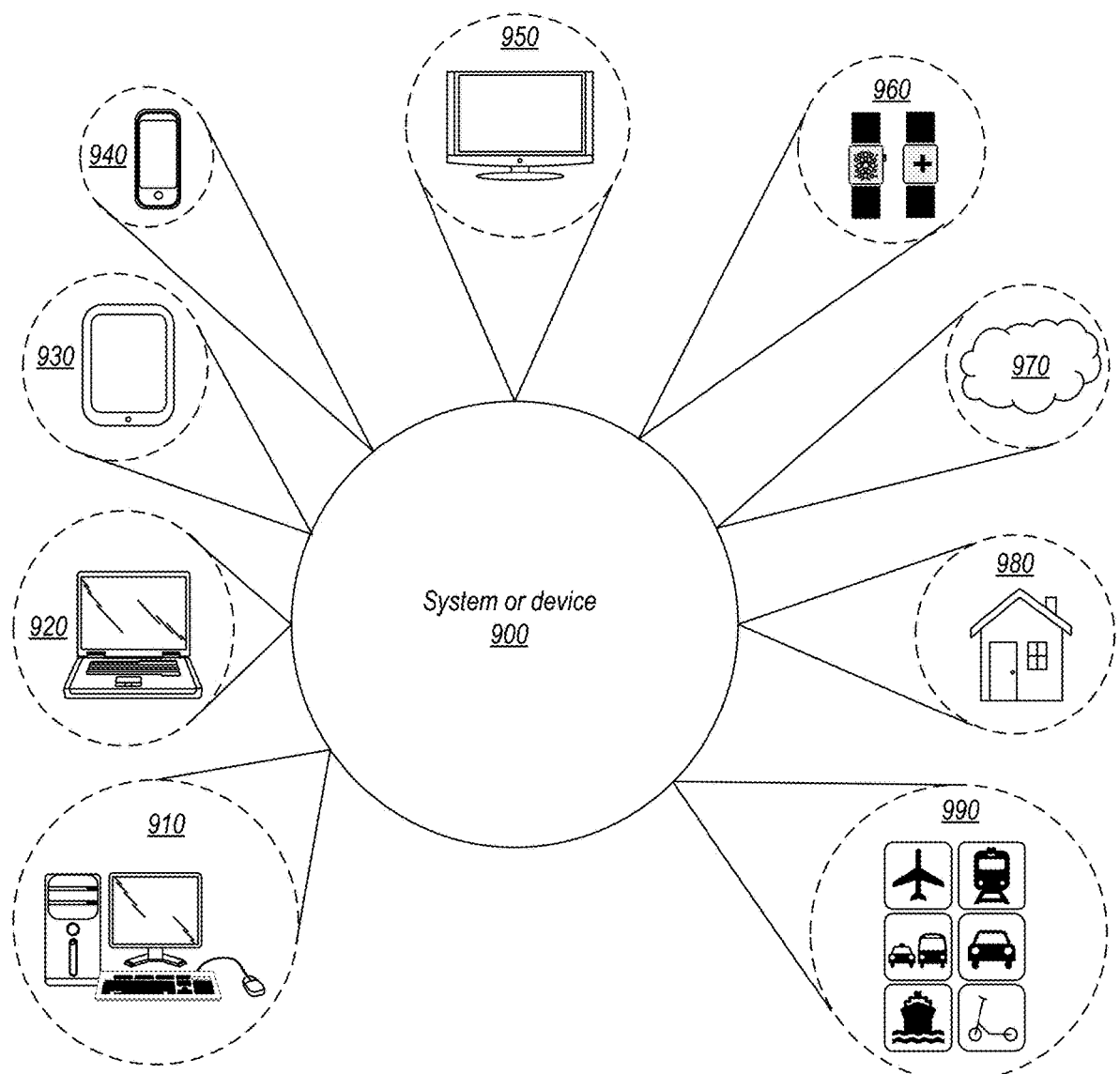
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 10:
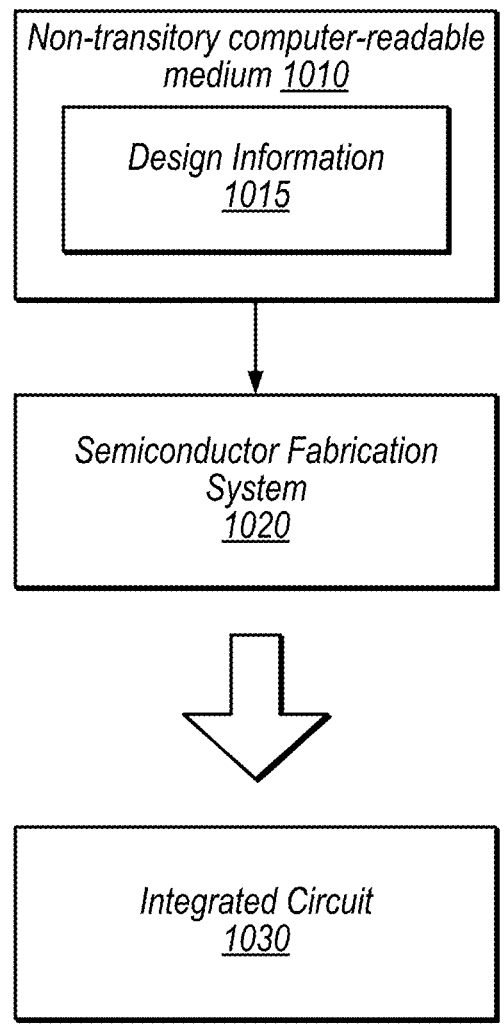
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 1-3, 5A, and 8. Further, integrated circuit 1030 may be configured to perform various functions described herein in conjunction with other components.

Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of. . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   fetch circuitry configured to fetch instructions for execution;
   tracking circuitry configured to generate history information based on respective addresses corresponding to multiple control transfer instructions in a stream of executed instructions;
   prediction circuitry configured to predict a next fetch address based on a current fetch address and the history information, including to:
      index into a first prediction table based on at least a portion of the current fetch address and at least a portion of the history information;
      compare tag data for an indexed location in the first prediction table with a tag that includes at least a portion of the current fetch address;
      in response to a comparison hit in the first prediction table, provide a predicted next fetch address from the first prediction table;
      access a second prediction table based on at least a portion of the current fetch address to generate another predicted next fetch address, wherein the second prediction table does not use control transfer history information; and
      in response to a hit in both the first prediction table and the second prediction table, select the predicted next fetch address from the first prediction table for a given cycle.

2. The apparatus of claim 1, wherein the tag data further includes history information based on respective addresses corresponding to multiple control transfer instructions.

3. The apparatus of claim 2, wherein:
   the history information included in the tag data is first history information that is based on target addresses of taken control transfers in the stream of executed instructions; and
   the history information used to index into the first prediction table is path history information based on program counters of taken control transfers in the stream of executed instructions.

4. The apparatus of claim 3, wherein:
to generate the tag data, the prediction circuitry is configured to hash the first history information and the at least a portion of the current fetch address; and
to generate the index into the first prediction table, the prediction circuitry is configured hash the path history information and the at least a portion of the current fetch address.

5. The apparatus of claim 1, wherein, to generate the history information, the tracking circuitry is configured to:
left-shift a current history value; and
perform a hash operation on the left-shifted current history value and address information corresponding to a taken control transfer instruction.

6. The apparatus of claim 1, wherein the first prediction table is configured to store predictions that fetch groups of one or more instructions do not include any taken control transfer instructions and the prediction circuitry is configured to train the first prediction table in response to a redirect due to a predicted-taken control transfer instruction.

7. The apparatus of claim 6, wherein the prediction circuitry is further configured to:
index into a second prediction table based on at least a portion of the current fetch address and at least a portion of the history information, wherein the second prediction table is configured to store predictions of taken control transfer instructions;
wherein control circuitry is configured to arbitrate when there are hits in both the first prediction table and the second prediction table.

8. The apparatus of claim 1, wherein:
the first prediction table includes a usefulness field;
the prediction circuitry is configured to:
adjust the usefulness field for an entry in response to adjustment trigger events;
in response to a hit in the first prediction table when the usefulness field meets a threshold, override one or more other prediction tables; and
in response to a hit in the first prediction table when the usefulness field does not meet the threshold, utilize the predicted next fetch address from the first prediction table only if there is not a hit in the one or more other prediction tables.

9. The apparatus of claim 1, wherein:
the prediction circuitry is configured to allocate an entry in the first prediction table in response to a redirect for a fetch group that did not hit in the first prediction table;
the first prediction table includes a usefulness field;
the prediction circuitry is configured to adjust the usefulness field for an entry in response to:
a correct prediction;
a mis-prediction by the prediction circuitry, using another table, that did not hit in the first prediction table; and
a failure to allocate an entry; and
the prediction circuitry is configured to invalidate an entry in the first prediction table in response to a misprediction based a hit in the first prediction table.

10. The apparatus of claim 1, wherein the prediction circuitry is configured to update a target of an entry in the first prediction table in response to a mis-predict by the first prediction table for a fetch group that includes a taken control transfer instruction.

11. The apparatus of claim 1, wherein the apparatus is a computing device that further includes:
a processor that includes the prediction circuitry;
a display; and
network interface circuitry.

12. A method, comprising:
fetching, by a computing device, instructions for execution;
generating, by the computing device, history information based on respective addresses corresponding to multiple control transfer instructions in a stream of executed instructions;
predicting, by the computing device, a next fetch address based on a current fetch address and the history information, including:
indexing into a first prediction table based on at least a portion of the current fetch address and at least a portion of the history information, wherein the first prediction table stores predictions that fetch groups of one or more instructions do not include any taken control transfer instructions;
comparing tag data for an indexed location in the first prediction table with a tag that includes at least a portion of the current fetch address;
in response to a comparison hit in the first prediction table, providing a predicted next fetch address from the first prediction table;
indexing into a second prediction table based on at least a portion of the current fetch address and at least a portion of the history information, wherein the second prediction table stores predictions of taken control transfer instructions; and
selecting a prediction from a prediction by the first prediction table and a prediction by the second prediction table in response to hits in both tables in a given cycle.

13. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
fetch circuitry configured to fetch instructions for execution;
tracking circuitry configured to generate history information based on respective addresses corresponding to multiple control transfer instructions in a stream of executed instructions;
prediction circuitry configured to predict a next fetch address based on a current fetch address and the history information, including to:
index into a first prediction table based on at least a portion of the current fetch address and at least a portion of the history information;
compare tag data for an indexed location in the first prediction table with a tag that includes at least a portion of the current fetch address;
in response to a comparison hit in the first prediction table, provide a predicted next fetch address from the first prediction table;
access a second prediction table based on at least a portion of the current fetch address to generate another predicted next fetch address, wherein the second prediction table does not use control transfer history information; and
in response to a hit in both the first prediction table and the second prediction table, select the predicted next fetch address from the first prediction table for a given cycle.

14. The non-transitory computer readable storage medium of claim 13, wherein the tag data further includes history information based on respective addresses corresponding to multiple control transfer instructions.

15. The non-transitory computer readable storage medium of claim 14, wherein:
- the history information included in the tag data is first history information that is based on target addresses of taken control transfers in the stream of executed instructions; and
- the history information used to index into the prediction table is path history information based on program counters of taken control transfers in the stream of executed instructions.

16. The non-transitory computer readable storage medium of claim 13, wherein the first prediction table is configured to store predictions that fetch groups of one or more instructions do not include any taken control transfer instructions and the prediction circuitry is configured to train the first prediction table in response to a redirect due to a predicted-taken control transfer instruction.

17. The non-transitory computer readable storage medium of claim 16, wherein the prediction circuitry is further configured to:
- index into a second prediction table based on at least a portion of the current fetch address and at least a portion of the history information, wherein the second prediction table is configured to store predictions of taken control transfer instructions.

\* \* \* \* \*